(12) United States Patent
Togashi

(10) Patent No.: US 11,868,670 B2
(45) Date of Patent: Jan. 9, 2024

(54) INFORMATION PROCESSING SYSTEM AND INFORMATION PROCESSING METHOD FOR MANAGING PRINT DATA INCLUDING PLURALITY OF PRINT DATA ELEMENTS

(71) Applicant: FUJIFILM Business Innovation Corp., Tokyo (JP)

(72) Inventor: Takuhiro Togashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/704,009

(22) Filed: Mar. 25, 2022

(65) Prior Publication Data

US 2023/0085689 A1 Mar. 23, 2023

(30) Foreign Application Priority Data

Sep. 22, 2021 (JP) .................................. 2021-154773

(51) Int. Cl.
*G06F 3/12* (2006.01)

(52) U.S. Cl.
CPC ............ *G06F 3/1274* (2013.01); *G06F 3/122* (2013.01); *G06F 3/1203* (2013.01); *G06F 3/1234* (2013.01)

(58) Field of Classification Search
CPC ...... G06F 3/1274; G06F 3/1203; G06F 16/00; G06F 16/113; G06F 16/162
USPC ........................ 358/1.15, 1.16, 1.9, 1.17, 403
See application file for complete search history.

(56) References Cited

U.S. PATENT DOCUMENTS

| | | | |
|---|---|---|---|
| 9,037,029 B2 | 5/2015 | Toriyabe | |
| 2003/0074373 A1* | 4/2003 | Kaburagi | ................ G06F 16/58 |
| 2009/0147310 A1* | 6/2009 | Tsunekawa | ........ G06K 15/1822 |
| | | | 358/1.15 |
| 2009/0290797 A1* | 11/2009 | Arakawa | ............... G06F 3/1204 |
| | | | 382/177 |

FOREIGN PATENT DOCUMENTS

JP 2005174174 6/2005
JP 2012238211 12/2012

* cited by examiner

*Primary Examiner* — Jamares Q Washington
(74) *Attorney, Agent, or Firm* — JCIPRNET

(57) ABSTRACT

An information processing system includes a management device configured to manage print data including print data elements. The management device includes a first processor configured to manage the print data and the print data elements in association with each other, and in response to specification of a possibility of reprinting of the print data, output the print data element to the processing device while associating information indicating the possibility of reprinting with the print data element. Each of the processing devices includes a second processor configured to process the print data element output from the management device, cause a memory to store the print data element associated with the information indicating the possibility of reprinting, and in response to a reprinting instruction from the management device, process the print data element associated with the information indicating the possibility of reprinting by reading the print data element from the memory.

20 Claims, 5 Drawing Sheets

FIG. 5

| PRINT JOB ID | POSSIBILITY OF REPRINTING | PART JOB INFORMATION | RECORD OF PRINTING |
|---|---|---|---|
| PRINT JOB 36 | YES | PART JOB 36A | |
| | | PART JOB 36B | |
| | | PART JOB 36C | |
| | | PART JOB 36D | |
| | | PART JOB 36E | |
| ... | ... | ... | ... |

FIG. 6

| PART JOB ID | POSSIBILITY OF REPRINTING | PRINTING CONDITION | STORAGE LOCATION | MANAGEMENT DEVICE IDENTIFICATION INFORMATION |
|---|---|---|---|---|
| PART JOB 36A | YES | ... | ... | WF MANAGEMENT DEVICE 10 |
| ... | ... | ... | ... | ... |

INFORMATION PROCESSING SYSTEM AND INFORMATION PROCESSING METHOD FOR MANAGING PRINT DATA INCLUDING PLURALITY OF PRINT DATA ELEMENTS

CROSS-REFERENCE TO RELATED APPLICATIONS

This application is based on and claims priority under 35 USC 119 from Japanese Patent Application No. 2021-154773 filed Sep. 22, 2021.

BACKGROUND

(i) Technical Field

The present disclosure relates to an information processing system and an information processing method.

(ii) Related Art

There is known a system including a processing device that processes print data to be used for printing in a printing device, and a management device that manages the print data and outputs the print data to the processing device. The processing device receives the print data from the management device and processes the print data.

The print data may include a plurality of print data elements. In this case, each print data element is output from the management device to a processing device associated with the print data element. The print data element is processed for printing.

Japanese Unexamined Patent Application Publication No. 2012-238211 describes a device that receives information on an error in a printing device or a post-processing device, updates job tickets of an error-occurring part and other parts if a target part needs reprinting, and transmits the job tickets to the printing device and the post-processing device.

Japanese Unexamined Patent Application Publication No. 2005-174174 describes a device that sets a time limit for a stored job, checks the time limit before reprinting, and avoids reprinting if the time limit has expired.

SUMMARY

Aspects of non-limiting embodiments of the present disclosure relate to the following circumstances. If the print data to be reprinted includes a plurality of print data elements, the management device may receive the print data again and output the print data elements to the processing device again, and the processing device may process the received print data elements again. In this case, however, it is necessary that the management device receives the print data again and outputs the print data elements to the processing device again.

In another conceivable method, a user who gives a reprinting instruction may search the print data for a print data element to be reprinted and output the print data element to the processing device. However, it takes time and effort to make the search.

It is appropriate that the system including the management device and the processing device process the print data including the plurality of print data elements while saving the user's time and effort to search for the print data element to be reprinted and achieving the print data reprinting without causing the management device to output the print data elements to the processing device again.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing system comprising: a management device configured to manage print data including a plurality of print data elements; and one or more processing devices configured to process the print data elements for printing, wherein the management device comprises a first processor, wherein the first processor is configured to: manage the print data and the plurality of print data elements in association with each other; output each of the print data elements to the processing device associated with the print data element; and in response to specification of a possibility of reprinting of the print data, output the print data element to the processing device while associating information indicating the possibility of reprinting with the print data element, wherein each of the processing devices comprises a second processor, and wherein the second processor is configured to: process the print data element output from the management device; cause a memory to store the print data element associated with the information indicating the possibility of reprinting; and, in response to a reprinting instruction from the management device, process the print data element associated with the information indicating the possibility of reprinting by reading the print data element from the memory.

BRIEF DESCRIPTION OF THE DRAWINGS

An exemplary embodiment of the present disclosure will be described in detail based on the following figures, wherein:

FIG. 5 illustrates information managed by the WF management device;

FIG. 6 illustrates information managed by the processing device;

DETAILED DESCRIPTION

Figure 1:
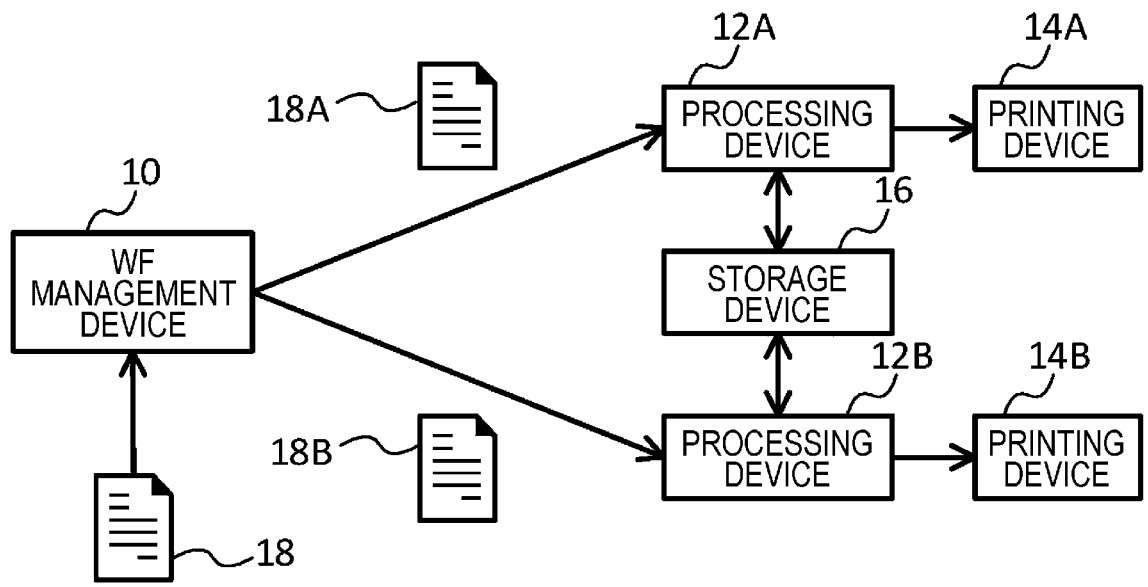
FIG. 1 is a block diagram illustrating the configuration of an information processing system.

An information processing system according to an exemplary embodiment is described with reference to FIG. 1. FIG. 1 illustrates an example of the configuration of the information processing system according to the exemplary embodiment.

For example, the information processing system according to the exemplary embodiment includes a WF management device 10, processing devices 12A and 12B, printing devices 14A and 14B, and a storage device 16. In the example illustrated in FIG. 1, the information processing system includes one WF management device, two processing devices, two printing devices, and one storage device, but the numbers of WF management devices, processing devices, printing devices, and storage devices are illustrative. The information processing system includes one or more WF management devices, one or more processing devices, one or more printing devices, and one or more storage devices. The processing devices 12A and 12B and the printing devices 14A and 14B are hereinafter referred to collectively as "processing devices 12" and "printing devices 14", respectively, unless otherwise distinguished.

The WF management device 10, the processing devices 12, the printing devices 14, and the storage device 16 have a function of communicating with other devices. The communication may be wired communication using cables or wireless communication. For example, those devices are connected to a communication path such as a local area network (LAN) or the Internet and communicate with each other via the communication path.

The WF management device 10 manages steps in a printing workflow (WF). For example, the printing workflow includes creation of a document, submission of the document, reading of the document, correction, composing (e.g., page creation), proofreading, imposition (e.g., data shaping), color proof, and printing. For example, the WF management device 10 manages printing costs (e.g., types and numbers of paper sheets used) and printing progress. The WF management device 10 is an example of a management device.

For example, the WF management device 10 receives print data on a print job from an external device, outputs the received print data to the processing device 12, and manages a workflow for the print job. The WF management device 10 may generate print data, output the generated print data to the processing device 12, and manage a workflow for a print job. The WF management device 10 may replicate the print data. The WF management device 10 may be superordinate over the processing device 12.

The print data is related to the entire print job and includes a plurality of print data elements. The print data element is related to a part job constituting the entire print job and includes document data to be printed (e.g., image or text data) and information indicating printing conditions for the document data (e.g., the number of print copies, the type of paper, and the size of paper). The print data element need not include the document data but may include information indicating a storage location of the document data (e.g., information indicating an address such as a URL). For example, the document data is described by a page description language (PDL).

For example, the print data is related to a print job for the entire book including a plurality of pages and the print data element is related to a part job for one or more pages constituting the book. Examples of the print data element include page data on front and back covers, page data on colophon, and page data on each chapter of the body. The print data element on the pages for the front and back covers includes document data on the front and back covers and information indicating printing conditions for the front and back covers. The print data element on the page for the colophon includes document data on the colophon and information indicating printing conditions for the colophon. The print data element on each chapter of the body includes document data on each chapter and information indicating printing conditions for each chapter. The book is an example of a printing target and a document other than the book may be the printing target. The print data may include one part job corresponding to the entire print job.

The WF management device 10 manages the print data on the entire print job and the plurality of print data elements constituting the print data in association with each other. For example, the WF management device 10 manages, in association with each other, print job identification information (e.g., a print job ID) for identifying the print data on the entire print job, part job identification information (e.g., a part job ID) for identifying each print data element constituting the print data, and processing device identification information (e.g., an IP or MAC address of each processing device 12) for identifying each processing device 12 that is an output destination of the print data element and processes the print data element. The print job identification information, the part job identification information, and the processing device identification information are stored in the WF management device 10 in association with each other.

For example, in response to reception of print data, the WF management device 10 generates print job identification information for identifying the print data and part job identification information on each print data element constituting the print data. As another example, the print job identification information and the part job identification information may be generated in advance and included in the print data.

The WF management device 10 outputs each print data element to the processing device 12 associated with the print data element. The processing device 12 associated with the print data element outputs the data to the printing device 14 having a function of printing document data in the print data element based on printing conditions in the print data element. For example, if the document data in the print data element is to be color-printed, the WF management device 10 outputs the print data element to the processing device 12 that outputs the data to the printing device 14 having a color printing function. For example, the processing device 12 that is the output destination of the print data element is specified in advance and its processing device identification information is associated with the print data element in advance. As another example, the WF management device 10 may determine the processing device 12 that processes the print data element by analyzing the document data and the printing conditions in the print data element, and output the print data element to the determined processing device 12.

The part job identification information may be generated by the processing device 12 in response to reception of the print data element output from the WF management device 10 and output from the processing device 12 to the WF management device 10 in response to the output of the print data element.

In response to specification of a possibility of reprinting of the print data, the WF management device 10 outputs the print data element to the processing device 12 while associating information indicating the possibility of reprinting with the print data element. For example, the information indicating the possibility of reprinting is included in the print data element. In response to the specification of the possibility of reprinting of the print data, the WF management device 10 manages the information indicating the possibility of reprinting of the print data in association with the print job identification information on the print data.

For example, a user specifies the possibility of reprinting of the print data. For example, the user may specify the possibility of reprinting of the print data by operating a user interface on the WF management device 10 or by operating a terminal device such as a personal computer. If the possibility of reprinting of the print data is specified by using the terminal device, information indicating the specification is output from the terminal device to the WF management device 10.

For example, a checkbox that reads "Save book job data which may be reprinted." is displayed on a user interface to be used for outputting the print data to the WF management device 10 or on a user interface of the WF management device 10. When the user marks the checkbox, the possibility of reprinting of the print data is specified.

The processing device 12 receives and processes a print data element. Examples of the processing device 12 include a digital front end (DFE). Specifically, the processing device 12 includes a raster image processor (RIP) that is a rasterizer and converts document data in the print data element into raster data (e.g., bitmap data) in a format suited to printing in the printing device 14.

The print data element is output from the WF management device 10 to the processing device 12. The processing device 12 receives and processes the print data element output from the WF management device 10. The print data element may be output to the processing device 12 from a device (e.g., a personal computer) other than the WF management device 10 and the processing device 12 may receive and process the print data element output from the other device. The processing device 12 may receive print data elements from a plurality of different WF management devices 10.

The processing device 12 may generate and process a print data element, replicate and process a print data element, generate print data on the entire print job, or change printing conditions in a print data element.

Intermediate data may be generated from document data and the processing device 12 may convert the intermediate data into raster data. The intermediate data may be generated by the WF management device 10 or by any other device.

The processing device 12 outputs the raster data to the printing device 14 associated with the processing device 12. For example, the processing device 12A outputs the raster data to the printing device 14A, and the processing device 12B outputs the raster data to the printing device 14B.

The printing device 14 receives the raster data to be printed from the processing device 12 and prints the raster data on a recording medium such as paper. Any printing system may be employed. Examples of the system include an inkjet system, an electrophotographic system, a thermal printing system, and a thermal transfer system. The printing device 14 may be included in the processing device 12.

In the example illustrated in FIG. 1, one printing device 14 is associated with one processing device 12. Specifically, the processing device 12A outputs the raster data to the printing device 14A, and the processing device 12B outputs the raster data to the printing device 14B. A plurality of printing devices 14 may be associated with one processing device 12 and the raster data may be output from the processing device 12 to the printing devices 14.

The processing device 12 causes the storage device 16 to store a print data element associated with information indicating a possibility of reprinting. In response to a reprinting instruction from the WF management device 10, the processing device 12 reads and processes the print data element associated with the information indicating the possibility of reprinting in the storage device 16. That is, the processing device 12 converts document data in this print data element into raster data and outputs the raster data to the printing device 14. In this manner, the print data element associated with the information indicating the possibility of reprinting is reprinted.

The processing device 12 may cause the storage device 16 to store the raster data generated by converting the document data in the print data element associated with the information indicating the possibility of reprinting. In this case, in response to the reprinting instruction from the WF management device 10, the processing device 12 outputs the stored raster data to the printing device 14 and causes the printing device 14 to print the raster data.

For example, the user gives the reprinting instruction. The user may specify print data reprinting by operating the user interface on the WF management device 10 or by operating the terminal device. If the reprinting instruction is given by using the terminal device, information indicating the instruction is output from the terminal device to the WF management device 10.

The processing device 12 manages, in association with each other, part job identification information on a print data element to be processed by the processing device 12, information indicating printing conditions for document data in the print data element, information indicating whether there is a possibility of reprinting, information indicating a storage location of the print data element (e.g., information indicating a storage address of the print data element in the storage device 16), and management device identification information for identifying the WF management device 10 that has output the print data element (e.g., an IP or MAC address or the name of the WF management device 10). Those pieces of information are stored in the processing device 12.

The entire print data element may be stored in the storage device 16. The document data in the print data element may be stored in the storage device 16 and the information indicating the printing conditions for the document data may be stored in the processing device 12 that processes the print data element instead of being stored in the storage device 16. Raster data generated by converting the document data may be stored in the storage device 16.

The format of the document data stored in the storage device 16 may be any format. For example, document data described by the page description language or raster data may be stored in the storage device 16.

The storage device 16 may be shared among the plurality of processing devices 12, provided for each individual processing device 12, or included in each processing device 12. For example, the storage device 16 may store print data elements received from the plurality of processing devices 12 or store a print data element received from the processing device 12 associated with the storage device 16. In the example illustrated in FIG. 1, the storage device 16 stores print data elements received from the processing devices 12A and 12B.

Examples of the storage device 16 include a hard disk drive (HDD), a solid-state drive (SSD), various memories (e.g., a RAM, a DRAM, and a ROM), other storage devices (e.g., an optical disc), and combinations thereof. The storage device 16 is an example of a memory.

The print data element associated with the information indicating the possibility of reprinting may be stored in a spool area on the processing device 12 or in an area on a network storage.

All the print data elements may be stored in the storage device 16 irrespective of whether there is a possibility of reprinting, and the print data element for which no reprinting instruction is given before an elapse of a predetermined period from the timing of storage in the storage device 16 may be deleted from the storage device 16.

The print data element associated with the information indicating the possibility of reprinting may be deleted after an elapse of a predetermined period from the timing of storage in the storage device 16. The print data element may be retained until a user's deletion instruction is given, and deleted in response to the user's deletion instruction.

For example, the WF management device 10 receives print data 18 on the entire print job from an external device. The print data 18 includes print data elements 18A and 18B on part jobs constituting the print job.

The processing device 12A has a function of processing document data in the print data element 18A. The printing device 14A has a function of printing the document data in the print data element 18A based on printing conditions in the print data element 18A.

The processing device 12B has a function of processing document data in the print data element 18B. The printing device 14B has a function of printing the document data in the print data element 18B based on printing conditions in the print data element 18B.

The WF management device 10 outputs the print data element 18A to the processing device 12A and the print data element 18B to the processing device 12B.

The processing device 12A converts the document data in the print data element 18A into raster data and outputs the raster data to the printing device 14A. The printing device 14A prints the raster data on a recording medium such as paper based on the printing conditions in the print data element 18A.

The processing device 12B converts the document data in the print data element 18B into raster data and outputs the raster data to the printing device 14B. The printing device 14B prints the raster data on a recording medium such as paper based on the printing conditions in the print data element 18B.

The WF management device 10 manages, in association with each other, a print job ID for identifying the print data 18, a part job ID for identifying the print data element 18A, a part job ID for identifying the print data element 18B, processing device identification information for identifying the processing device 12A that is an output destination of the print data element 18A (e.g., an IP address of the processing device 12A), and processing device identification information for identifying the processing device 12B that is an output destination of the print data element 18B (e.g., an IP address of the processing device 12B). For example, the print job ID of the print data 18, the part job ID of the print data element 18A, the part job ID of the print data element 18B, the IP address of the processing device 12A, and the IP address of the processing device 12B are stored in the WF management device 10 in association with each other.

In response to specification of a possibility of reprinting of the print data 18, the WF management device 10 manages information indicating the possibility of reprinting in association with the print job ID of the print data 18.

The WF management device 10 outputs the print data element 18A to the processing device 12A and the print data element 18B to the processing device 12B while associating the information indicating the possibility of reprinting with the print data elements 18A and 18B. The print data elements 18A and 18B are stored in the storage device 16.

In response to a reprinting instruction for the print data 18, the WF management device 10 outputs information indicating a reprinting instruction for the print data element 18A to the processing device 12A and information indicating a reprinting instruction for the print data element 18B to the processing device 12B by referring to the part job IDs and the IP addresses associated with the print job ID of the print data 18. For example, the reprinting instruction for the print data 18 is given by specifying the print job ID.

The processing device 12A that has received the reprinting instruction reads the print data element 18A from the storage device 16, generates raster data from the print data element 18A, and outputs the generated raster data to the printing device 14A. The processing device 12B that has received the reprinting instruction reads the print data element 18B from the storage device 16, generates raster data from the print data element 18B, and outputs the generated raster data to the printing device 14B. If the raster data is stored in the storage device 16, the processing device 12A reads the raster data from the storage device 16 and outputs the raster data to the printing device 14A. The same applies to the processing device 12B.

The printing devices 14A and 14B receive and print the respective pieces of raster data. In this manner, the print data 18 is reprinted.

Figure 2:
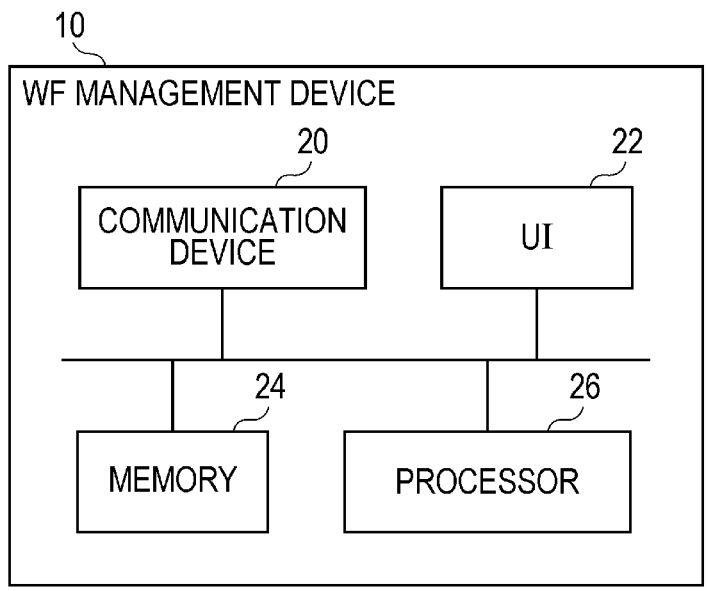
FIG. 2 is a block diagram illustrating the hardware configuration of a WF management device.

The hardware configuration of the WF management device 10 is described with reference to FIG. 2. FIG. 2 illustrates an example of the hardware configuration of the WF management device 10.

For example, the WF management device 10 includes a communication device 20, a UI 22, a memory 24, and a processor 26.

The communication device 20 is a communication interface including a communication chip or a communication circuit and has functions of transmitting information to and receiving information from other devices by wireless or wired communication.

The UI 22 is a user interface including a display and an operation device. Examples of the display include a liquid crystal display and an EL display. Examples of the operation device include a keyboard, a mouse, input keys, and an operation panel. The UI 22 may be a touch panel including both the display and the operation device. The UI 22 may include a microphone or a loudspeaker.

The memory 24 has one or more data storage areas. Examples of the memory 24 include a hard disk drive (HDD), a solid-state drive (SSD), various memories (e.g., a RAM, a DRAM, and a ROM), other storage devices (e.g., an optical disc), and combinations thereof. The WF management device 10 includes one or more memories 24.

The processor 26 controls operations of the individual parts of the WF management device 10. The processor 26 may include a memory. The processor 26 is an example of a first processor.

Figure 3:
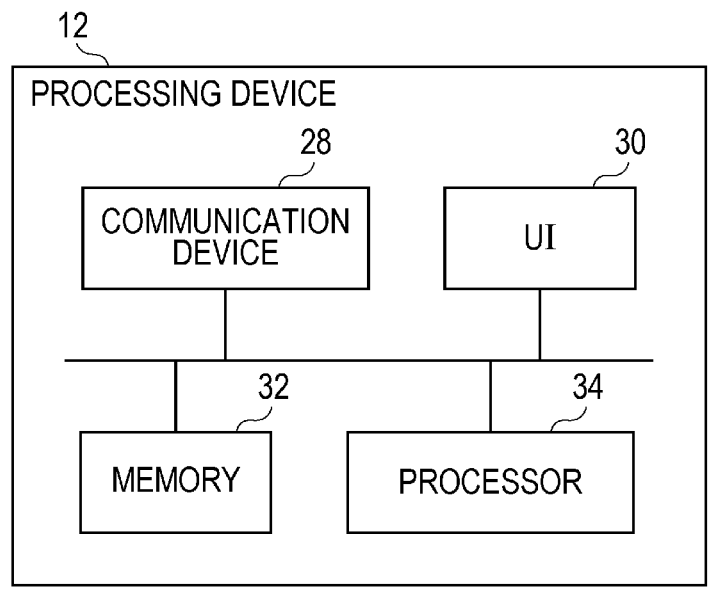
FIG. 3 is a block diagram illustrating the hardware configuration of a processing device.

The hardware configuration of the processing device 12 is described with reference to FIG. 3. FIG. 3 illustrates an example of the hardware configuration of the processing device 12.

For example, the processing device 12 includes a communication device 28, a UI 30, a memory 32, and a processor 34.

The communication device 28 is a communication interface including a communication chip or a communication circuit and has functions of transmitting information to and receiving information from other devices by wireless or wired communication.

The UI 30 is a user interface including a display and an operation device. Examples of the display include a liquid crystal display and an EL display. Examples of the operation device include a keyboard, a mouse, input keys, and an operation panel. The UI 30 may be a touch panel including both the display and the operation device. The UI 30 may include a microphone or a loudspeaker.

The memory 32 has one or more data storage areas. Examples of the memory 32 include a hard disk drive (HDD), a solid-state drive (SSD), various memories (e.g., a RAM, a DRAM, and a ROM), other storage devices (e.g., an optical disc), and combinations thereof. The processing device 12 includes one or more memories 32.

The processor 34 controls operations of the individual parts of the processing device 12. The processor 34 may include a memory. The processor 34 is an example of a second processor.

The exemplary embodiment is described in detail taking specific examples.

Figure 4:
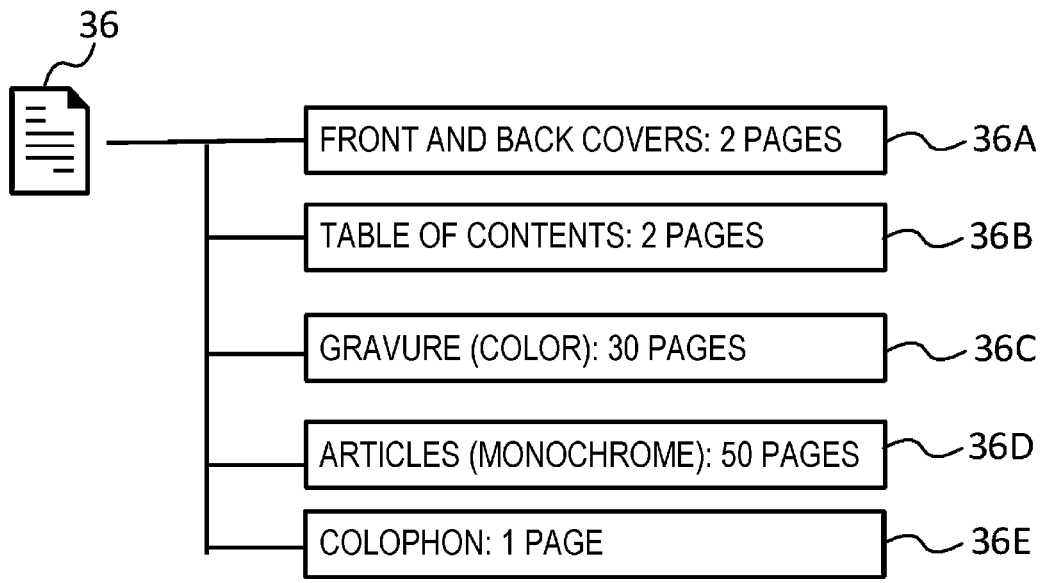
FIG. 4 illustrates the entire print job and part jobs.

The entire print job and the part jobs are described with reference to FIG. 4. FIG. 4 illustrates the entire print job and the part jobs.

A print job 36 is the entire print job including part jobs 36A, 36B, 36C, 36D, and 36E. That is, print data on the print job 36 includes a print data element on the part job 36A, a print data element on the part job 36B, a print data element on the part job 36C, a print data element on the part job 36D, and a print data element on the part job 36E.

In the example illustrated in FIG. 4, the print job 36 is related to a book and the part jobs are related to a front cover and chapters constituting the book. Specifically, the part job 36A is a two-page job for front and back covers, the part job 36B is a two-page job for table of contents, the part job 36C is a 30-page job for color gravure, the part job 36D is a 50-page job for monochrome articles, and the part job 36E is a one-page job for colophon.

In response to reception of the print data on the print job 36, the processor 26 of the WF management device 10 outputs the print data elements on the part jobs to the processing devices 12 associated with processes on the part jobs.

For example, if the printing device 14A has a color printing function, the processor 26 outputs the print data element on the part job 36C to the processing device 12A. The processor 34 of the processing device 12A converts document data on the part job 36C into raster data and outputs the raster data to the printing device 14A.

If the printing device 14B has a monochrome printing function, the processor 26 outputs the print data element on the part job 36D to the processing device 12B. The processor 34 of the processing device 12B converts document data on the part job 36D into raster data and outputs the raster data to the printing device 14B.

Information managed by the WF management device 10 is described with reference to FIG. 5. FIG. 5 illustrates an example of the information managed by the WF management device 10.

The processor 26 of the WF management device 10 manages, for each print job, a print job ID, information indicating whether there is a possibility of reprinting, part job information, and information indicating a record of printing while storing those pieces of information in the memory 24 in association with each other.

The print job ID is an example of print job identification information for identifying print data on the entire print job in the WF management device 10.

In response to specification of a possibility of reprinting of the print data, the processor 26 associates information indicating the possibility of reprinting of the print data with a print job ID of the print data. Without the specification of the possibility of reprinting of the print data, the processor 26 does not associate the information indicating the possibility of reprinting of the print data with the print job ID of the print data.

The part job information is related to a print data element in the print data on the entire print job and includes, for example, part job identification information (e.g., a part job ID) for identifying the print data element, processing device identification information (e.g., an IP address of the processing device 12) for identifying the processing device 12 that is an output destination of the print data element, and information indicating the name of the part job.

For example, the information indicating the record of printing includes information indicating a date and time of printing, information indicating a date and time of the last printing, and information indicating a cumulative number of print copies.

For example, when the print data on the print job 36 is output to and received by the WF management device 10, the processor 26 generates a print job ID for identifying the print data on the print job 36.

In response to specification of a possibility of reprinting in the print job 36, the processor 26 associates information indicating the possibility of reprinting with the print job ID of the print job 36.

The processor 26 outputs the print data elements on the part jobs 36A, 36B, 36C, 36D, and 36E in the print data on the print job 36 to the associated processing devices 12. In response to the specification of the possibility of reprinting, the processor 26 outputs the information indicating the possibility of reprinting to the processing devices 12 in association with the print data elements. Without the specification of the possibility of reprinting, the processor 26 outputs the information indicating the possibility of reprinting to the processing devices 12 without associating the information with the print data elements.

The pieces of information in the part job information may be included in the print data on the print job 36 in advance, generated by the processor 26 of the WF management device 10, or generated by the processor 34 of the processing device 12 that is the output destination of the print data element and output to the WF management device 10. The processor 26 associates the pieces of part job information on the part jobs 36A, 36B, 36C, 36D, and 36E with the print job ID of the print data on the print job 36.

When the document data in the print data element is printed by each printing device 14, information indicating a record of the printing is output from each processing device 12 to the WF management device 10. The processor 26 of the WF management device 10 receives the information indicating the record of printing of the document data in each print data element from each processing device 12 and associates the information with the print job ID.

Information managed by the processing device 12 is described with reference to FIG. 6. FIG. 6 illustrates an example of the information managed by the processing device 12. For example, information managed by the processing device 12A is described but the processing device 12 other than the processing device 12A also manages information related to a print data element to be processed by the processing device 12.

The processor 34 of the processing device 12A causes the memory 32 to store, for each part job in association with each other, a part job ID, information indicating whether there is a possibility of reprinting, information indicating printing conditions, information indicating a storage location of a print data element, and management device identification information for identifying the WF management device 10.

The part job ID is an example of part job identification information for identifying a print data element to be processed by the processing device 12A (e.g., the print data element on the part job 36A). The part job ID may be included in the print data element in advance or generated by the processor 34 of the processing device 12 that has received the print data element.

If information indicating the possibility of reprinting is associated with the print data element received by the processing device 12A (e.g., the print data element on the part job 36A), the processor 34 of the processing device 12A associates the information indicating the possibility of reprinting with the part job ID as the information indicating whether there is a possibility of reprinting.

If the information indicating the possibility of reprinting is not associated with the print data element, the processor 34 of the processing device 12A does not associate the information indicating the possibility of reprinting with the part job ID. In this case, the processor 34 of the processing device 12A may associate information indicating no possibility of reprinting with the part job ID.

When the print data element associated with the information indicating the possibility of reprinting (e.g., the print data element on the part job 36A) is received from the WF management device 10, the processor 34 of the processing device 12A causes the storage device 16 to store the print data element. The processor 34 of the processing device 12A associates information indicating a storage location (e.g., an address) of the print data element in the storage device 16 with the part job ID.

The information indicating whether there is a possibility of reprinting has a meaning of information indicating whether to store the print data element. Since the print data element associated with the information indicating the possibility of reprinting is stored in the storage device 16, the information indicating the possibility of reprinting has a meaning of information indicating the storage of the print data element. In place of the information indicating the possibility of reprinting, the processor 26 of the WF management device 10 may associate information indicating the storage of the print data element with each print data element constituting the print data for which the possibility of reprinting is specified. For example, a flag indicating the storage of the print data element is associated with the print data element.

The processor 34 of the processing device 12 may cause the storage device 16 to store the entire print data element or may cause the storage device 16 to store the document data in the print data element and the memory 32 of the processing device 12 to store the information indicating the printing conditions in the print data element instead of the storage device 16.

The management device identification information on the WF management device 10 is associated with each print data element output from the WF management device 10 to each processing device 12. The processor 34 of each processing device 12 associates, with the part job ID of the print data element managed by the processing device 12, the management device identification information associated with the print data element received from the WF management device 10.

The print job ID of the print data including the print data element may be associated with the print data element and the print data element and the print job ID may be output from the WF management device 10 to each processing device 12. In this case, the processor 34 associates the print job ID with the part job ID of the print data element received by the processing device 12.

For example, the print data element on the part job 36A is output from the WF management device 10 to the processing device 12A. The processor 34 of the processing device 12A checks whether information indicating a possibility of reprinting is associated with the print data element on the part job 36A.

If the information indicating the possibility of reprinting is associated with the print data element on the part job 36A, the processor 34 of the processing device 12A causes the storage device 16 to store the print data element on the part job 36A and associates the information indicating the possibility of reprinting with a part job ID of the part job 36A. The processor 34 of the processing device 12A associates information indicating a storage location (e.g., an address) of the print data element on the part job 36A in the storage device 16 with the part job ID of the part job 36A.

If the information indicating the possibility of reprinting is not associated with the print data element on the part job 36A, the processor 34 of the processing device 12A does not cause the storage device 16 to store the print data element on the part job 36A and does not associate the information indicating the possibility of reprinting with the part job ID of the part job 36A.

The processor 34 of the processing device 12A associates, with the part job ID of the part job 36A, management device identification information associated with the print data element on the part job 36A and information indicating printing conditions for the part job 36A.

The processor 34 of the processing device 12A converts document data in the print data element on the part job 36A into raster data, outputs the raster data to the printing device 14A, and causes the printing device 14A to print the raster data based on the printing conditions in the print data element on the part job 36A. The printing device 14A prints the raster data on a recording medium such as paper based on the printing conditions.

In response to the printing in the part job 36A, the processor 34 of the processing device 12A outputs information indicating a record of the printing to the WF management device 10. When the information indicating the record of the printing in the part job 36A is received from the processing device 12A, the processor 26 of the WF management device 10 associates the information indicating the record of the printing with the print job ID associated with the part job ID of the part job 36A.

Similarly to the part job 36A, the other part jobs are processed by the processing device 12 and printed by the printing device 14, and records of the printing are managed by the WF management device 10.

Figure 7:
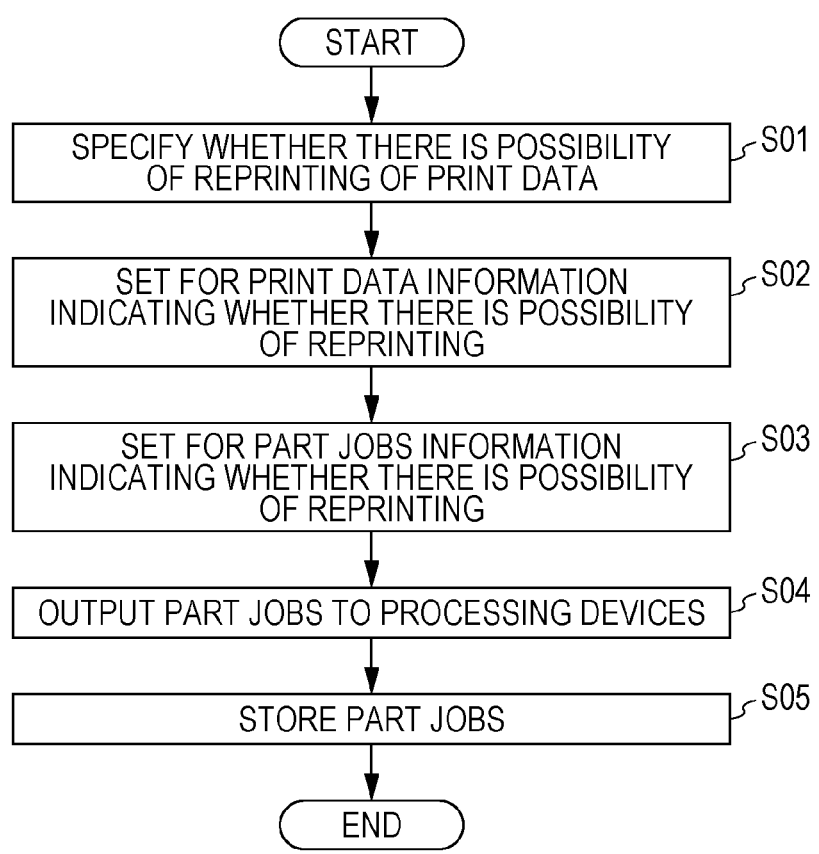
FIG. 7 is a flowchart illustrating a flow of processes when outputting print data from the WF management device to the processing device.

A flow of processes when outputting print data from the WF management device 10 to the processing device 12 is described with reference to FIG. 7. FIG. 7 is a flowchart illustrating the flow of processes.

Print data on the entire print job is output from a device such as the terminal device to the WF management device 10. For example, the print data on the print job 36 in FIG. 4 is output to the WF management device 10.

The user specifies whether there is a possibility of reprinting of the print data on the print job 36 on the UI 22 of the WF management device 10 (S01). For example, the processor 26 of the WF management device 10 causes the display of the UI 22 to display the print job ID of the print job 36 and a checkbox for specifying whether there is a possibility of reprinting. When the user marks the checkbox, the possibility of reprinting is specified. The print job ID of the print job 36 and the checkbox may be displayed on a device such as the user's terminal device and whether there is a possibility of reprinting may be specified on that device.

The processor 26 of the WF management device 10 manages the print job ID of the print job 36, information indicating whether there is a possibility of reprinting, the pieces of part job information on the part jobs 36A, 36B, 36C, 36D, and 36E, and information indicating records of printing while storing those pieces of information in the memory 24 in association with each other.

Examples of the timing to specify the possibility of reprinting include a timing of reception of the print data by the WF management device 10, a timing of output of the print data from the external device to the WF management device 10, and a timing of output of the print data element on the part job from the WF management device 10 to each processing device 12. The possibility of reprinting may be specified at any other timing.

The processor 26 sets the information indicating whether there is a possibility of reprinting for the print data on the print job 36 (S02). Specifically, in response to the specification of the possibility of reprinting in Step S01, the processor 26 associates information indicating the possibility of reprinting with the print data on the print job 36. Without the specification of the possibility of reprinting in Step S01, the processor 26 does not associate the information indicating the possibility of reprinting with the print data on the print job 36.

The processor 26 sets information indicating whether there is a possibility of reprinting for each of the part jobs 36A, 36B, 36C, 36D, and 36E (S03). Specifically, in response to the specification of the possibility of reprinting in Step S01, the processor 26 associates information indicating the possibility of reprinting with the print data element on each of the part jobs 36A, 36B, 36C, 36D, and 36E. In place of the information indicating the possibility of reprinting, the processor 26 may associate information indicating the storage of the print data element with the print data element on each of the part jobs 36A, 36B, 36C, 36D, and 36E. Without the specification of the possibility of reprinting in Step S01, the processor 26 does not associate the information indicating the possibility of reprinting with the print data element on each of the part jobs 36A, 36B, 36C, 36D, and 36E.

The processor 26 outputs the print data elements on the part jobs 36A, 36B, 36C, 36D, and 36E to the associated processing devices 12 (S04). For example, the processor 26 outputs the print data element on the part job 36A to the processing device 12A and the print data element on the part job 36B to the processing device 12B. The print data elements on the part jobs 36C, 36D, and 36E are similarly output to the associated processing devices 12. In response to the specification of the possibility of reprinting in Step S01, the print data elements on the part jobs 36A, 36B, 36C, 36D, and 36E associated with the information indicating the possibility of reprinting are output from the WF management device 10 to the processing devices 12. Without the specification of the possibility of reprinting in Step S01, the print data elements on the part jobs 36A, 36B, 36C, 36D, and 36E that are not associated with the information indicating the possibility of reprinting are output from the WF management device 10 to the processing devices 12. The document data in each print data element is not stored in the WF management device 10. The document data may be stored in the WF management device 10.

The processor 34 of each processing device 12 that has received the print data element causes the storage device 16 to store the print data element if the information indicating the possibility of reprinting is associated with the print data element (S05). If the information indicating the possibility of reprinting is not associated with the print data element, the processor 34 does not cause the storage device 16 to store the print data element.

The processor 34 of the processing device 12 causes the memory 32 to store, in association with each other, the part job ID of the print data element received by the processing device 12, the information indicating whether there is a possibility of reprinting, the information indicating the printing conditions, the information indicating the storage location of the print data element, and the management device identification information for identifying the WF management device 10.

If the information indicating the possibility of reprinting is associated with the print data element, the information indicating the storage location of the print data element in the storage device 16 is associated with the part job ID of the print data element. If the information indicating the possibility of reprinting is not associated with the print data element, the information indicating the storage location of the print data element is not associated with the part job ID of the print data element.

In response to the specification of the possibility of reprinting of the print data on the print job 36 in Step S01, the processor 34 of the processing device 12A causes the memory 32 to store, in association with each other, the part job ID of the part job 36A, the information indicating the possibility of reprinting, the information indicating the printing conditions in the print data element on the part job 36A, the information indicating the storage location of the print data element in the storage device 16, and the management device identification information on the WF management device 10. The same applies to the other processing devices 12.

The processor 34 of the processing device 12A converts the document data in the print data element on the part job 36A into raster data and outputs the raster data to the printing device 14A. The printing device 14A prints the raster data on a recording medium such as paper based on the printing conditions in the print data element on the part job 36A. The same applies to the other processing devices 12 and the other printing devices 14.

The information indicating the record of printing of each print data element is output from the processing device 12 to the WF management device 10. The processor 26 of the WF management device 10 associates the information indicating the record of printing with the print job ID of the print job 36.

Figure 8:
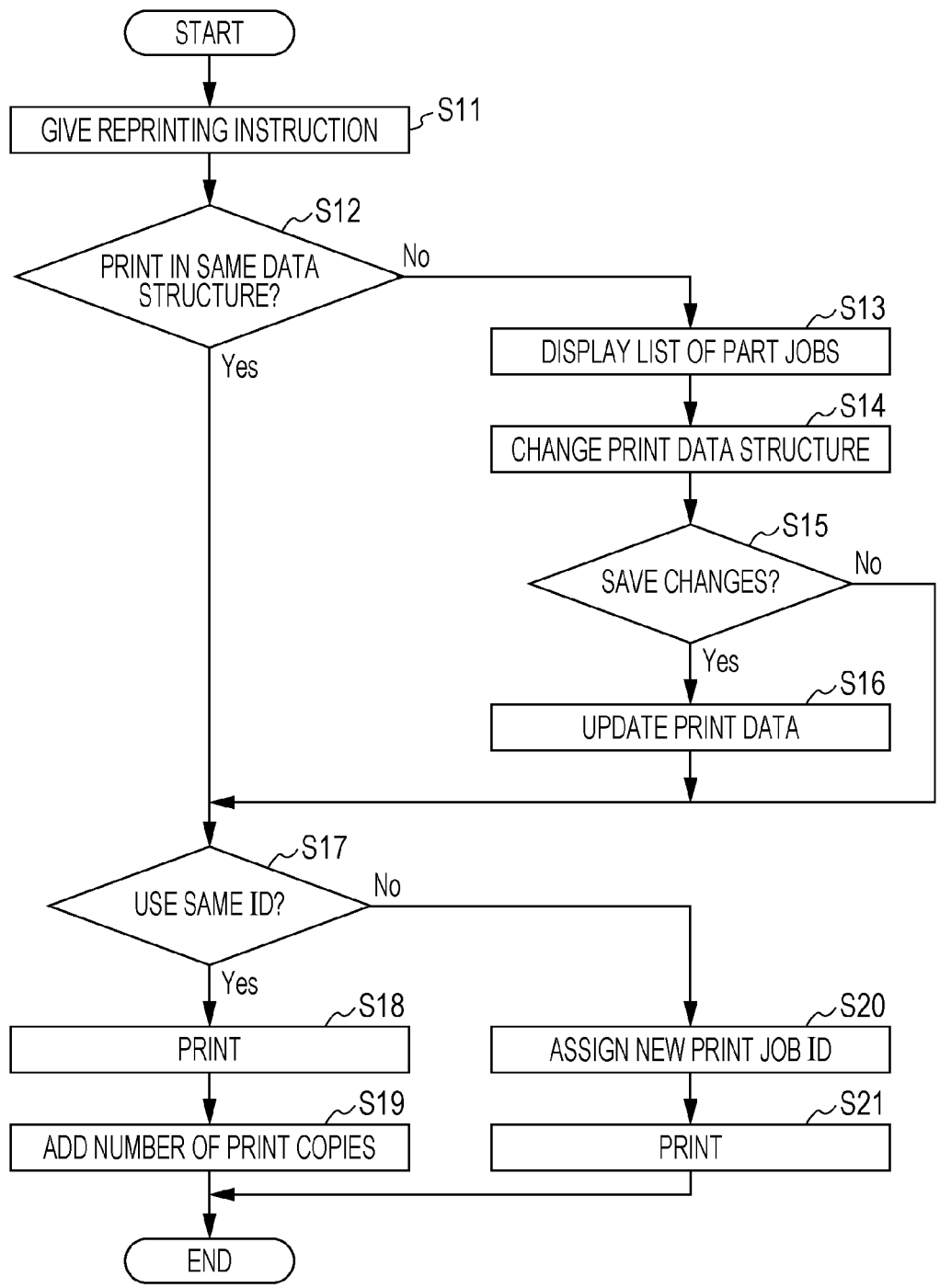
FIG. 8 is a flowchart illustrating a flow of processes for reprinting.

A flow of processes for reprinting is described with reference to FIG. 8. FIG. 8 is a flowchart illustrating the flow of processes.

The processor 26 of the WF management device 10 finds print jobs associated with information indicating that printing has been completed and there is a possibility of reprinting by referring to pieces of information associated with print job IDs and indicating records of printing and pieces of information associated with the print job IDs and indicating whether there is a possibility of reprinting. The processor 26 causes the display of the UI 22 to display a list of the found print jobs (e.g., a list of the print job IDs). For example, when the user operates the UI 22 to give an instruction to display the list, the processor 26 finds the print jobs associated with the information indicating that the printing has been completed and there is a possibility of reprinting, and causes the display to display the list of the found print jobs.

The user operates the UI 22 of the WF management device 10 to specify the print job for reprinting from the list and give a reprinting instruction (S11). The list may be displayed on a display of a device such as the user's terminal device and the user may operate the device to specify the print job for reprinting and give the reprinting instruction.

For example, the print job 36 is specified for reprinting and an instruction is given to reprint the print data on the print job 36.

The user may operate the UI 22 of the WF management device 10 to change the structure of the print data on the print job 36. The processor 26 of the WF management device 10 changes the structure of the print data in response to a user's instruction.

Examples of the change of the structure of the print data include deletion of a part job constituting the print data (i.e., deletion of a print data element), addition of a part job, a change of the printing order of the part jobs, and replacement of a part job.

If the user operates the UI 22 of the WF management device 10 to give an instruction to change the structure of the print data on the print job 36, that is, the user does not intend to print the print data in the same structure (S12: No), the processor 26 of the WF management device 10 causes the display of the UI 22 to display a list of the part jobs 36A, 36B, 36C, 36D, and 36E (S13).

The user operates the UI 22 to specify the print data element to be changed from the list and give an instruction to delete the specified print data element, change the printing order, or replace the print data element. In response to the user's instruction, the processor 26 deletes the specified print data element, changes the printing order of the print data elements, or replaces the print data element (S14). If the user operates the UI 22 to give an instruction to add a print data element on a new part job, the processor 26 adds the print data element on the new part job to the print data on the print job 36. For example, the user specifies a position of insertion of the new print data element in the part jobs 36A, 36B, 36C, 36D, and 36E and the processor 26 places the new print data element at the specified position. For example, if the insertion position of a new part job 36F is specified between the part job 36B and the part job 36C, the processor 26 places the part job 36F at the specified position. Thus, the print data elements on the part jobs are placed in the order of the part jobs 36A, 36B, 36F, 36C, 36D, and 36E.

If the user operates the UI 22 to give an instruction to save the changes (S15: Yes), the processor 26 of the WF management device 10 updates the print data on the print job 36 (S16).

If any part job is deleted, the processor 26 gives an instruction to delete the print data element on the deleted part job to the processing device 12 that is an output destination of the print data element. The processor 34 of the processing device 12 that has received the instruction deletes the print data element from the storage device 16, does not process the print data element, and does not cause the printing device 14 to print the document data in the print data element.

If any part job is added, the processor 26 outputs a print data element on the added part job to the processing device 12 associated with that print data element. The processor 34 of the processing device 12 that has received the print data element causes the storage device 16 to store the print data element, processes the print data element, and causes the printing device 14 to print document data in the print data element.

If any part job is replaced, the processor 26 outputs a print data element on a part job after the replacement to the processing device 12 that is an output destination of the print data element on the part job before the replacement. The processor 34 of the processing device 12 that has received the print data element on the part job after the replacement deletes the print data element on the part job before the replacement from the storage device 16, causes the storage device 16 to store the print data element on the part job after the replacement, processes the print data element, and causes the printing device 14 to print document data in the print data element.

If the user does not operate the UI 22 to give the instruction to save the changes (S15: No), the processor 26 of the WF management device 10 does not update the print data on the print job 36. In this case, the process proceeds to Step S17.

The user may operate a device such as the terminal device to give the instruction to change the print data. Information indicating the instruction is output from the device to the WF management device 10. The processor 26 of the WF management device 10 changes the document data in response to the instruction.

If the user does not operate the UI 22 of the WF management device 10 to give the instruction to change the structure of the print data on the print job 36, that is, the user intends to print the print data in the same structure (S12: Yes), the process proceeds to Step S17.

The user operates the UI 22 to specify whether to manage the print data to be reprinted by using the same print job ID as the print job ID of the print job 36 (S17).

For example, the processor 26 of the WF management device 10 causes the display of the UI 22 to display information for inquiring of the user whether to manage the print data to be reprinted by using the same print job ID as the print job ID of the print job 36. For example, the processor 26 causes the display to display a checkbox for giving an instruction to manage the print data by using the same print job ID. If the user marks the checkbox, the instruction is given to manage the print data to be reprinted by using the same print job ID as the print job ID of the print job 36. If the user does not mark the checkbox, no instruction is given to manage the print data to be reprinted by using the same print job ID as the print job ID of the print job 36.

If the user gives the instruction to manage the print data to be reprinted by using the same print job ID as the print job ID of the print job 36 (S17: Yes), each piece of document data in the print job 36 is printed by each printing device 14 (S18). For example, the processor 26 of the WF management device 10 outputs the part job ID of each part job in the print job 36 and information indicating the reprinting instruction to the processing device 12 that is an output destination of the print data element on the part job. The processor 34 of the processing device 12 that has received the instruction reads, from the storage device 16, the print data element associated with the received part job ID, processes the print data element, and outputs raster data to the printing device 14. The printing device 14 that has received the raster data prints the raster data on a recording medium such as paper. If the structure of the print data on the print job 36 is changed, the document data is printed based on the changed print data.

The processor 26 of the WF management device 10 manages the print data to be reprinted by using the print job ID of the print job 36. For example, when the print data to be reprinted is actually reprinted, the processor 26 associates information indicating a record of the printing with the print job ID of the print job 36. Therefore, the reprinting is managed as a record of the print job 36. Thus, the processor 26 of the WF management device 10 manages the print data to be reprinted as the same print data as the print data before the reprinting (i.e., the print data on the print job 36).

Specifically, the processor 26 adds the number of reprinted copies to the records of printing associated with the print job ID of the print job 36 (S19). Thus, the record of printing of the reprinted print data is managed as the record of printing of the print job 36.

If the user gives an instruction not to manage the print data to be reprinted by using the same print job ID as the print job ID of the print job 36 (S17: No), the processor 26 of the WF management device 10 generates a new print job ID for identifying the print data to be reprinted and assigns the new print job ID to the print data to be reprinted (S20). That is, the processor 26 manages the new print job ID, pieces of part job information on part jobs in the print data to be reprinted, and information indicating a record of printing in association with each other. Thus, the processor 26 manages the print data to be reprinted as new print data different from the print data on the print job 36.

Each piece of document data in the print job 36 is printed by each printing device 14 (S21). For example, the processor 26 of the WF management device 10 outputs the part job ID of each part job in the print job 36 and information indicating the reprinting instruction to the processing device 12 that is an output destination of the print data element on the part job. The processor 34 of the processing device 12 that has received the instruction reads, from the storage device 16, the print data element associated with the received part job ID, processes the print data element, and outputs raster data to the printing device 14. The printing device 14 that has received the raster data prints the raster data on a recording medium such as paper. If the structure of the print data on the print job 36 is changed, the document data is printed based on the changed print data.

The processor 26 of the WF management device 10 adds a reprinting result to the records of printing associated with the new print job ID. For example, the processor 26 adds information indicating the number of reprinted copies to the information indicating the records of printing. Thus, the record of the reprinted print data (e.g., the number of print copies) and the records of the print data on the original print job 36 are managed separately.

Description is made about processes for deleting a print data element stored in the storage device 16.

When the user gives an instruction to delete a print data element stored in the storage device 16 and print data including the print data element to be deleted is managed by the WF management device 10 in association with information indicating a possibility of reprinting, the processor 34 of the processing device 12 that has received the deletion instruction may output alert information. That is, when the user gives an instruction to delete a print data element that may be used again, the processor 34 of the processing device 12 may output alert information.

If the user gives the deletion instruction after the alert information has been output, the processor 34 of the processing device 12 deletes the print data element to be deleted from the storage device 16. If the user gives no deletion instruction after the alert information has been output, the processor 34 does not delete the print data element to be deleted from the storage device 16.

For example, the user operates the UI 30 of the processing device 12 to specify the print data element to be deleted and give the deletion instruction. The user may operate his/her terminal device to specify the print data to be deleted and give the deletion instruction. For example, the display of the UI 30 displays a list of part jobs managed by the processing device 12. The user specifies the part job to be deleted in the list and gives the deletion instruction.

The processor 34 of the processing device 12 may cause the display of the UI 30 to display the alert information, output the alert information to the user's terminal device and cause the display of the terminal device to display the alert information, or cause the loudspeaker to output voice indicating the alert information. Examples of the alert information to be displayed on the display or output as voice from the loudspeaker include a message "The print data element to be deleted may be reprinted."

For example, if a print data element associated with information indicating a possibility of reprinting is received from the WF management device 10, the processor 34 of the processing device 12 causes the storage device 16 to store the print data element in association with the information indicating the possibility of reprinting. If a print data element for which the user has given a deletion instruction is associated with information indicating a possibility of reprinting, the processor 34 outputs alert information. If this print data element is not associated with the information indicating the possibility of reprinting, the processor 34 deletes this print data element without outputting the alert information.

As another example, the processor 34 of the processing device 12 may output, to the WF management device 10, a part job ID of the print data element for which the deletion instruction is given and inquire whether this print data element is included in print data associated with information indicating a possibility of reprinting. As a response to the inquiry, the processor 26 of the WF management device 10 outputs, to the processing device 12, information indicating whether this print data element is included in the print data associated with the information indicating the possibility of reprinting (see FIG. 5). The processor 34 controls the output of the alert information depending on the response from the WF management device 10. If this print data element is included in the print data associated with the information indicating the possibility of reprinting, the processor 34 outputs the alert information. If this print data element is not included in the print data associated with the information indicating the possibility of reprinting, the processor 34 does not output the alert information.

Print data and print data elements may be output to the processing device 12 from a device other than the WF management device 10 and stored in the storage device 16. Those print data and print data elements are not managed by the WF management device 10 as print data and print data elements having a possibility of reprinting. Therefore, if a deletion instruction is given, the processor 34 of the processing device 12 deletes those print data and print data elements without outputting alert information.

For example, the user operates the UI 30 of the processing device 12A to give an instruction to display a list of part jobs managed by the processing device 12A. The processor 34 of the processing device 12A that has received the instruction causes the display of the UI 30 of the processing device 12A to display the list. For example, a list including the part job 36A is displayed. The user specifies a part job to be deleted in the list and gives a deletion instruction. For example, the user gives an instruction to delete the print data element on the part job 36A.

Since the print data element on the part job 36A is stored in the storage device 16 in association with the information indicating the possibility of reprinting, the processor 34 of the processing device 12A outputs alert information. If the user gives the deletion instruction after the alert information has been output, the processor 34 of the processing device 12A deletes the print data element on the part job 36A from the storage device 16. If the user gives no deletion instruction, the processor 34 of the processing device 12A does not delete the print data element on the part job 36A.

As another example, the processor 34 of the processing device 12A may output, to the WF management device 10, the part job ID of the part job 36A for which the deletion instruction is given and inquire whether the print data element on the part job 36A is included in print data associated with information indicating a possibility of reprinting. The part job 36A is associated with the print job ID of the print job 36, and the print job ID of the print job 36 is associated with the information indicating the possibility of reprinting (see FIG. 5). As a response to the inquiry, the processor 26 of the WF management device 10 outputs the information indicating the possibility of reprinting to the processing device 12A. In response to reception of the information, the processor 34 of the processing device 12A outputs the alert information.

If the user gives an instruction to delete a print data element stored in the storage device 16, the processor 34 of the processing device 12 may output information for inquiring of the user whether to collectively delete the other print data elements in the same print data together with the print data element to be deleted.

For example, the processor 34 of the processing device 12 outputs, to the WF management device 10, a part job ID of the print data element for which the deletion instruction is given and inquires of the WF management device 10 whether a print job ID associated with the part job ID is managed by the WF management device 10 (see FIG. 5). As a response to the inquiry, the processor 26 of the WF management device 10 outputs, to the processing device 12, information indicating whether the associated print job ID is managed by the WF management device 10.

Depending on the response from the WF management device 10, the processor 34 of the processing device 12 outputs the information for inquiring of the user whether to collectively delete the print data elements.

If the print job ID associated with the part job ID of the print data element for which the deletion instruction is given is managed by the WF management device 10, the processor 34 of the processing device 12 outputs the information for inquiring of the user whether to collectively delete the print data elements. For example, the processor 34 may cause the display of the UI 30 to display a message "Do you want to collectively delete the part jobs in the entire print job?", cause the display of the user's terminal device to display the message, or cause the loudspeaker to output voice indicating the message.

If the user operates the UI 30 of the processing device 12 or his/her terminal device to give an instruction to collectively delete the print data elements, the processor 34 of the processing device 12 that has received the instruction deletes, from the storage device 16, the print data element for which the deletion instruction is given. The processor 34 outputs the part job ID of the deleted print data element and information indicating the collective deletion instruction to the WF management device 10. The processor 26 of the WF management device 10 finds the other part job IDs associated with the print job ID associated with the part job ID of the deleted print data element. The processor 26 outputs the found part job IDs and information indicating the instruction to delete print data elements with the found part job IDs to each processing device 12 that is an output destination of the print data elements with the found part job IDs. The processor 34 of the processing device 12 that has received the deletion instruction deletes, from the storage device 16, the print data elements with the part job IDs output from the WF management device 10. In this manner, the other print data elements in the print data including the print data element for which the deletion instruction is given are collectively deleted together with the print data element for which the deletion instruction is given.

If the print job ID associated with the part job ID of the print data element for which the deletion instruction is given is not managed by the WF management device 10, the processor 34 of the processing device 12 does not output the information for inquiring of the user whether to collectively delete the print data elements. In this case, the processor 34 deletes, from the storage device 16, the print data element for which the deletion instruction is given.

For example, the user operates the UI 30 of the processing device 12A to give an instruction to display a list of part jobs managed by the processing device 12A. The processor 34 of the processing device 12A that has received the instruction causes the display of the UI 30 of the processing device 12A to display the list. For example, a list including the part job 36A is displayed. The user specifies a part job to be deleted in the list and gives a deletion instruction. For example, the user gives an instruction to delete the print data element on the part job 36A.

The processor 34 of the processing device 12A outputs, to the WF management device 10, the part job ID of the part job 36A for which the deletion instruction is given and inquires of the WF management device 10 whether the print job ID associated with the part job ID is managed by the WF management device 10. The part job 36A is associated with the print job ID of the print job 36. As a response to the inquiry, the processor 26 of the WF management device 10 outputs, to the processing device 12A, information indicating that the print job ID associated with the part job ID is managed by the WF management device 10. That is, the processor 26 outputs, to the processing device 12A, information indicating that the part job 36A constitutes the print job 36 together with other part jobs (see FIG. 5). The processor 34 of the processing device 12A outputs information for inquiring of the user whether to collectively delete all the print data elements in the print job 36 including the part job 36A. If the user gives an instruction to collectively delete the print data elements, the processor 34 of the processing device 12A deletes the print data element on the part job 36A from the storage device 16. The processor 34 of the processing device 12A outputs the part job ID of the part job 36A and information indicating the collective deletion instruction to the WF management device 10. The processor 26 of the WF management device 10 finds the other part job IDs associated with the print job ID associated with the part job ID of the part job 36A. In this case, the part job IDs of the part jobs 36B, 36C, 36D, and 36E are found. The processor 26 outputs the part job IDs of the part jobs to be deleted and information indicating the deletion instruction to the processing devices 12 that are output destinations of the part jobs 36B, 36C, 36D, and 36E. For example, the processor 26 outputs, to the processing device 12B, the part job ID of the part job 36B and information indicating an instruction to delete the part job 36B. The processor 34 of the processing device 12B deletes the print data element on the part job 36B from the storage device 16. The same applies to the other part jobs.

In response to deletion of a print data element, the processor 34 of the processing device 12 may output a part job ID of the deleted print data element to the WF management device 10. If the part job ID output from the processing device 12 is managed by the WF management device 10 in association with the print job ID, the processor 26 of the WF management device 10 may associate, with the print job ID, information indicating that the print data element with the part job ID has been deleted, thereby managing the deletion of the print data element.

For example, the functions of the WF management device 10 and the processing device 12 are implemented by cooperation between hardware and software. For example, the functions of each device are implemented such that the processor of the device reads and executes a program stored in the memory of the device. The program is stored in the memory via a recording medium such as a CD or a DVD or via a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
   a management device configured to manage print data including a plurality of print data elements; and
   one or more processing devices configured to process the print data elements for printing,
   wherein the management device comprises a first processor,
   wherein the first processor is configured to:
      receive the print data on a print job, wherein each of the print data elements is related to a part job constituting the print job and comprises document data to be printed or a storage location of the document data and information indicating printing conditions for the document data;
      manage the print data on the print job and the plurality of print data elements in association with each other;
      determine the processing device for processing each of the print data elements by analyzing the document data and the printing conditions in the print data element;
      output each of the print data elements to the determined processing device; and
      in response to specification of a possibility of reprinting for the print data on the print job, set information indicating the possibility of reprinting for the print data and output the print data element to the processing device while associating the information indicating the possibility of reprinting with the print data element,
   wherein each of the processing devices comprises a second processor, and
   wherein the second processor is configured to:
      process the print data element output from the management device;
      cause a memory to store the print data element associated with the information indicating the possibility of reprinting; and
      in response to a reprinting instruction from the management device, process the print data element associated with the information indicating the possibility of reprinting by reading the print data element from the memory.

2. The information processing system according to claim 1, wherein the first processor is further configured to, when reprinting the print data, manage the print data as data identical to the print data before reprinting.

3. The information processing system according to claim 1, wherein the first processor is further configured to, when reprinting the print data, manage the print data as new print data.

4. The information processing system according to claim 1, wherein the first processor is further configured to, when reprinting the print data, change a structure of the print data in response to an instruction from a user.

5. The information processing system according to claim 2, wherein the first processor is further configured to, when reprinting the print data, change a structure of the print data in response to an instruction from a user.

6. The information processing system according to claim 3, wherein the first processor is further configured to, when reprinting the print data, change a structure of the print data in response to an instruction from a user.

7. The information processing system according to claim 1,
   wherein the first processor is further configured to manage the print data having the possibility of reprinting in association with the information indicating the possibility of reprinting, and
   wherein the second processor is further configured to output alert information if a user gives an instruction to delete the print data element stored in the memory and the print data including the print data element to be deleted is managed by the management device in association with the information indicating the possibility of reprinting.

8. The information processing system according to claim 2,
   wherein the first processor is further configured to manage the print data having the possibility of reprinting in association with the information indicating the possibility of reprinting, and
   wherein the second processor is further configured to output alert information if a user gives an instruction to delete the print data element stored in the memory and the print data including the print data element to be deleted is managed by the management device in association with the information indicating the possibility of reprinting.

9. The information processing system according to claim 3,
wherein the first processor is further configured to manage the print data having the possibility of reprinting in association with the information indicating the possibility of reprinting, and
wherein the second processor is further configured to output alert information if a user gives an instruction to delete the print data element stored in the memory and the print data including the print data element to be deleted is managed by the management device in association with the information indicating the possibility of reprinting.

10. The information processing system according to claim 4,
wherein the first processor is further configured to manage the print data having the possibility of reprinting in association with the information indicating the possibility of reprinting, and
wherein the second processor is further configured to output alert information if a user gives an instruction to delete the print data element stored in the memory and the print data including the print data element to be deleted is managed by the management device in association with the information indicating the possibility of reprinting.

11. The information processing system according to claim 5,
wherein the first processor is further configured to manage the print data having the possibility of reprinting in association with the information indicating the possibility of reprinting, and
wherein the second processor is further configured to output alert information if a user gives an instruction to delete the print data element stored in the memory and the print data including the print data element to be deleted is managed by the management device in association with the information indicating the possibility of reprinting.

12. The information processing system according to claim 6,
wherein the first processor is further configured to manage the print data having the possibility of reprinting in association with the information indicating the possibility of reprinting, and
wherein the second processor is further configured to output alert information if a user gives an instruction to delete the print data element stored in the memory and the print data including the print data element to be deleted is managed by the management device in association with the information indicating the possibility of reprinting.

13. The information processing system according to claim 1, wherein the second processor is further configured to, if a user gives an instruction to delete the print data element stored in the memory, output information for inquiring of the user whether to collectively delete the other print data elements in the print data together with the print data element to be deleted.

14. The information processing system according to claim 2, wherein the second processor is further configured to, if a user gives an instruction to delete the print data element stored in the memory, output information for inquiring of the user whether to collectively delete the other print data elements in the print data together with the print data element to be deleted.

15. The information processing system according to claim 3, wherein the second processor is further configured to, if a user gives an instruction to delete the print data element stored in the memory, output information for inquiring of the user whether to collectively delete the other print data elements in the print data together with the print data element to be deleted.

16. The information processing system according to claim 4, wherein the second processor is further configured to, if a user gives an instruction to delete the print data element stored in the memory, output information for inquiring of the user whether to collectively delete the other print data elements in the print data together with the print data element to be deleted.

17. The information processing system according to claim 5, wherein the second processor is further configured to, if a user gives an instruction to delete the print data element stored in the memory, output information for inquiring of the user whether to collectively delete the other print data elements in the print data together with the print data element to be deleted.

18. The information processing system according to claim 6, wherein the second processor is further configured to, if a user gives an instruction to delete the print data element stored in the memory, output information for inquiring of the user whether to collectively delete the other print data elements in the print data together with the print data element to be deleted.

19. The information processing system according to claim 7, wherein the second processor is further configured to output information for inquiring of the user whether to collectively delete the other print data elements in the print data together with the print data element to be deleted.

20. An information processing method for an information processing system comprising a management device configured to manage print data including a plurality of print data elements, and one or more processing devices configured to process the print data elements for printing, the information processing method comprising:
receiving the print data on a print job, wherein each of the print data elements is related to a part job constituting the print job and comprises document data to be printed or a storage location of the document data and information indicating printing conditions for the document data;
managing the print data on the print job and the plurality of print data elements in association with each other;
determining the processing device for processing each of the print data elements by analyzing the document data and the printing conditions in the print data element;
outputting each of the print data elements to the determined processing device;
in response to specification of a possibility of reprinting for the print data on the print job, setting information indicating the possibility of reprinting for the print data and outputting the print data element to the processing device while associating the information indicating the possibility of reprinting with the print data element;
processing the print data element output from the management device;
causing a memory to store the print data element associated with the information indicating the possibility of reprinting; and
in response to a reprinting instruction from the management device, processing the print data element associated with the information indicating the possibility of reprinting by reading the print data element from the memory.

\* \* \* \* \*